US009413973B2

(12) United States Patent
Rodriguez et al.

(10) Patent No.: US 9,413,973 B2
(45) Date of Patent: Aug. 9, 2016

(54) MULTIPOSITION HANDHELD ELECTRONIC MAGNIFIER

(71) Applicant: Freedom Scientific, Inc., St. Petersburg, FL (US)

(72) Inventors: Carlos M. Rodriguez, Palm Harbor, FL (US); Patrick Murphy, Riverview, FL (US); Waldemar H. Tunkis, Palm Harbor, FL (US); Todd Conard, Ruskin, FL (US); Michael Goldenberg, Melbourne, FL (US); Jeffery McDaniel, Largo, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 14/456,799

(22) Filed: Aug. 11, 2014

(65) Prior Publication Data

US 2014/0347457 A1    Nov. 27, 2014

Related U.S. Application Data

(63) Continuation of application No. 13/584,204, filed on Aug. 13, 2012, now Pat. No. 8,804,031, which is a continuation of application No. 12/478,993, filed on Jun. 5, 2009, now Pat. No. 8,264,598, which is a (Continued)

(51) Int. Cl.
*H04N 5/232* (2006.01)
*H04N 1/00* (2006.01)
*H04N 5/225* (2006.01)
*H04N 101/00* (2006.01)

(52) U.S. Cl.
CPC ....... *H04N 5/23296* (2013.01); *H04N 1/00129* (2013.01); *H04N 5/2252* (2013.01); *H04N 5/23293* (2013.01); *H04N 2101/00* (2013.01)

(58) Field of Classification Search
CPC ................. H04N 5/2251; H04N 5/23296
USPC .......................................................... 348/373
See application file for complete search history.

(56) References Cited

U.S. PATENT DOCUMENTS

| 3,252,067 A | 5/1966 | Derenbecher, Jr. |
| 3,253,529 A | 5/1966 | Fahlenberg |
| 3,850,523 A | 11/1974 | Skavnak |

(Continued)

FOREIGN PATENT DOCUMENTS

| EP | 1921838 A2 | 5/2008 |
| GB | 2403370 A | 12/2004 |

(Continued)

OTHER PUBLICATIONS https://www.youtube.com/watch?v=gGev2Qx1Pxo (Jan. 16, 2008), Userlife.*

(Continued)

*Primary Examiner* — James Hannett
(74) *Attorney, Agent, or Firm* — GrayRobinson P.A.; Michael J. Colitz, III

(57) ABSTRACT

Disclosed is a magnifier for use by blind or low vision users. The magnifier includes a camera, such as a CMOS image sensor, that displays enlarged images upon a screen for easy viewing. The magnifier further includes a handle that is pivotally interconnected to a housing to allow for handheld use in a variety of different configurations.

6 Claims, 5 Drawing Sheets

Related U.S. Application Data continuation-in-part of application No. 12/235,182, filed on Sep. 22, 2008, now Pat. No. 8,259,222.

(60) Provisional application No. 61/085,966, filed on Aug. 4, 2008.

(56) References Cited

U.S. PATENT DOCUMENTS

| | | | |
|---|---|---|---|
| 4,362,806 | A | 12/1982 | Whitmore |
| 4,456,931 | A | 6/1984 | Toyoda et al. |
| 4,799,049 | A | 1/1989 | Avila |
| 5,335,192 | A | 8/1994 | Oshiba |
| 5,633,674 | A | 5/1997 | Trulaske et al. |
| 5,703,661 | A | 12/1997 | Wu |
| 5,717,964 | A | 2/1998 | Dowe |
| 5,739,859 | A | 4/1998 | Hattori et al. |
| 5,748,228 | A | 5/1998 | Kobayashi et al. |
| 5,815,735 | A | 9/1998 | Baker |
| 5,893,651 | A | 4/1999 | Sakamoto |
| D454,146 | S | 3/2002 | Mori |
| 6,636,359 | B2 | 10/2003 | Travers et al. |
| 6,642,505 | B1 | 11/2003 | Nakano et al. |
| D488,440 | S | 4/2004 | Senda |
| 6,767,107 | B1 | 7/2004 | Leifer et al. |
| 6,809,741 | B1 | 10/2004 | Bates et al. |
| D503,944 | S | 4/2005 | Adachi et al. |
| 6,956,616 | B2 | 10/2005 | Jung et al. |
| 6,971,600 | B2 | 12/2005 | Cheung |
| 6,971,700 | B2 | 12/2005 | Blanger et al. |
| 6,977,676 | B1 | 12/2005 | Sato et al. |
| 7,106,357 | B2 * | 9/2006 | Fukuda et al. ............ 348/14.02 |
| 7,119,319 | B2 | 10/2006 | Noto et al. |
| 7,170,557 | B2 | 1/2007 | Manico et al. |
| 7,172,304 | B2 | 2/2007 | Rodriguez et al. |
| 7,172,305 | B2 | 2/2007 | Rodriguez et al. |
| 7,295,244 | B2 | 11/2007 | Manico et al. |
| 7,336,295 | B2 | 2/2008 | Sukenari et al. |
| D614,220 | S | 4/2010 | Goldenberg |
| 8,115,831 | B2 | 2/2012 | Rodriquez et al. |
| 8,264,598 | B2 * | 9/2012 | Rodriquez et al. ............ 348/373 |
| 2001/0002850 | A1 | 6/2001 | Slatter |
| 2002/0063791 | A1 | 5/2002 | Waterman et al. |
| 2002/0071047 | A1 | 6/2002 | Strong et al. |
| 2003/0040346 | A1 * | 2/2003 | Fukuda et al. ............ 455/575 |
| 2003/0063214 | A1 | 4/2003 | Van Hees |
| 2003/0210340 | A1 | 11/2003 | Romanowich |
| 2004/0141062 | A1 | 7/2004 | Pilu et al. |
| 2004/0246340 | A1 | 12/2004 | Sukenari et al. |
| 2005/0002666 | A1 * | 1/2005 | Asai et al. ............ 396/429 |
| 2005/0062847 | A1 * | 3/2005 | Johnston ............ 348/62 |
| 2005/0141099 | A1 | 6/2005 | Bang et al. |
| 2005/0162512 | A1 | 7/2005 | Seakins |
| 2005/0198779 | A1 * | 9/2005 | Jung et al. ............ 16/367 |
| 2006/0018508 | A1 | 1/2006 | Monk et al. |
| 2006/0034601 | A1 | 2/2006 | Andersson et al. |
| 2006/0158427 | A1 | 7/2006 | Goldenberg et al. |
| 2006/0268569 | A1 | 11/2006 | Rodriguez et al. |
| 2007/0018919 | A1 | 1/2007 | Zavracky et al. |
| 2007/0035853 | A1 | 2/2007 | Bendror et al. |
| 2007/0040907 | A1 | 2/2007 | Kern et al. |
| 2007/0223906 | A1 | 9/2007 | Hanney et al. |
| 2007/0263014 | A1 | 11/2007 | Ketola et al. |
| 2007/0273708 | A1 | 11/2007 | Andreasson et al. |
| 2007/0296845 | A1 | 12/2007 | Watanabe et al. |
| 2008/0165141 | A1 | 7/2008 | Christie |
| 2009/0059038 | A1 | 3/2009 | Seakins et al. |
| 2009/0160996 | A1 | 6/2009 | Yamaoka et al. |
| 2010/0026854 | A1 | 2/2010 | Rodriguez et al. |
| 2010/0026855 | A1 | 2/2010 | Conard et al. |
| 2010/0073545 | A1 | 3/2010 | Rodriquez et al. |

FOREIGN PATENT DOCUMENTS

| | | |
|---|---|---|
| JP | 2003051971 A | 2/2003 |
| WO | 2007021478 A2 | 2/2007 |

OTHER PUBLICATIONS

European Patent Office, Communication Pursuant to Rule 114(2) EPC, Third Party Observations, filed in connection with European Patent Application No. 10784085.2, dated Nov. 25, 2014.
https://www.youtube.com/watch?v=gGev2Qx1Pxo (Jan. 16, 2008).
https://www.youtube.com/watch?v=NVOabbCDDPQ (Dec. 4, 2008).

* cited by examiner

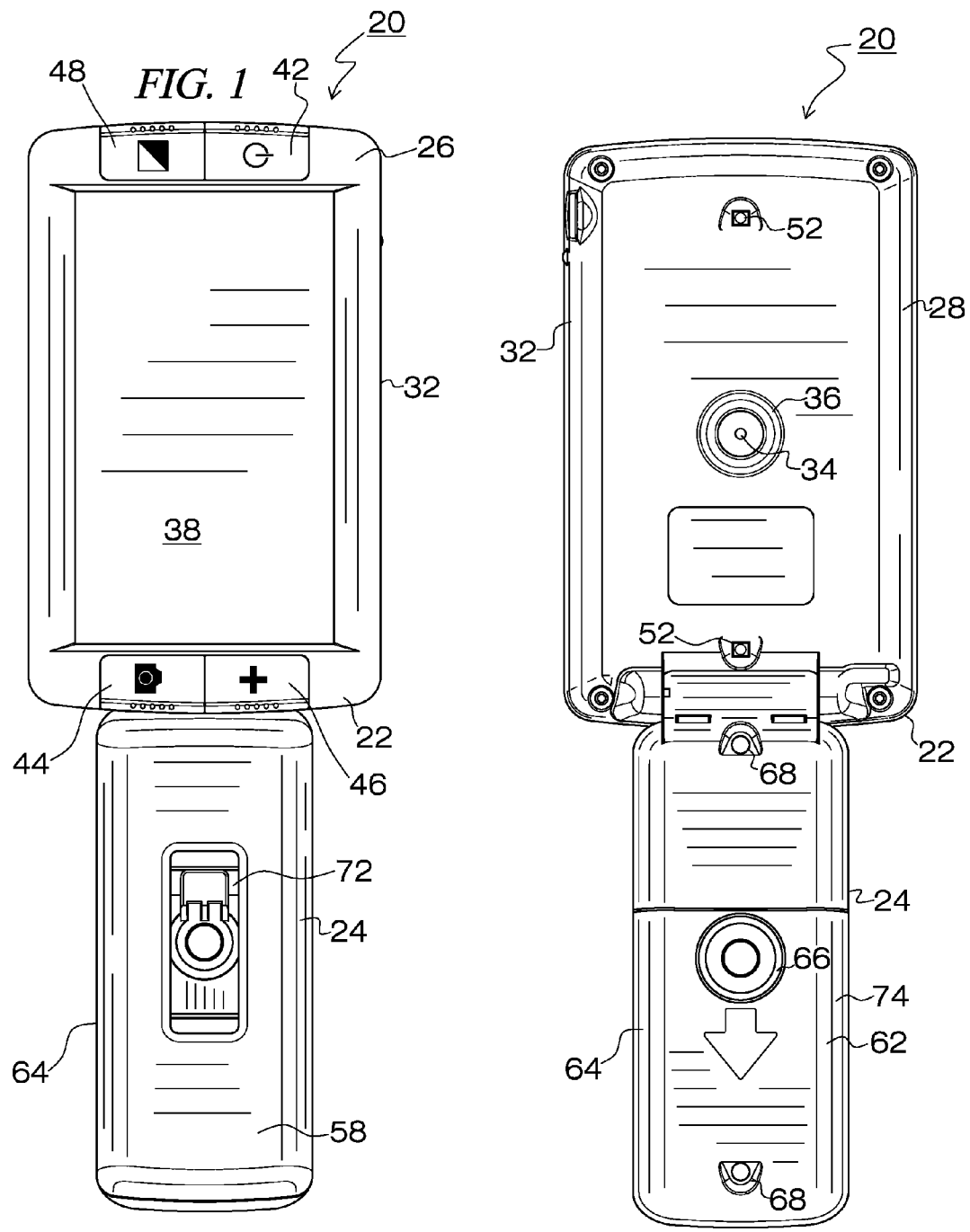

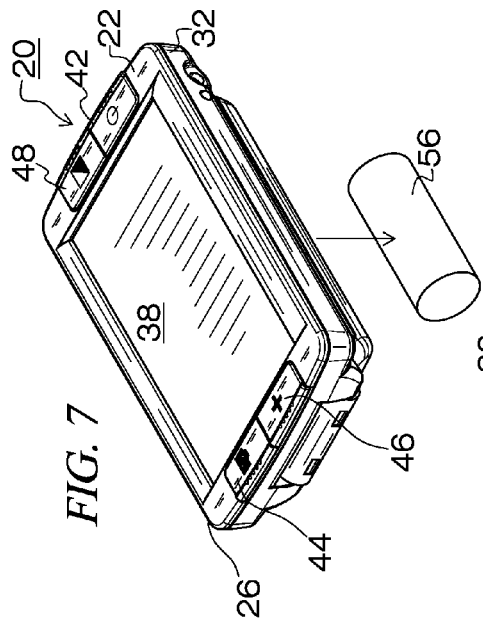
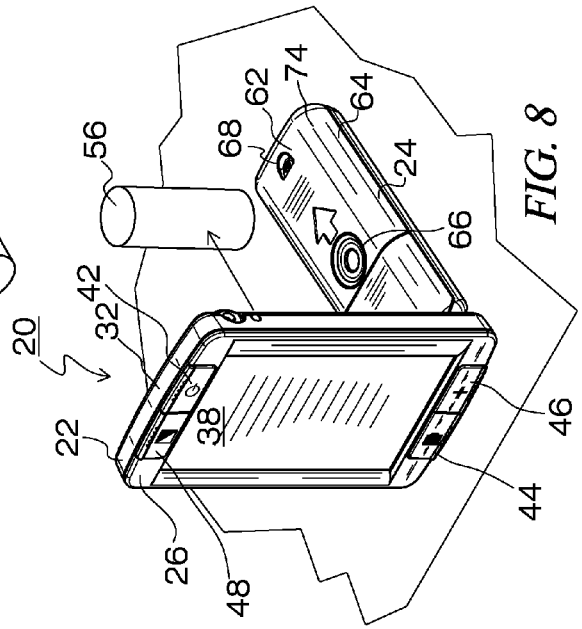
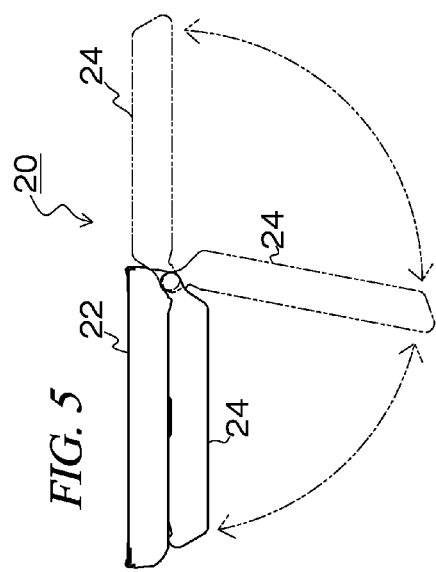
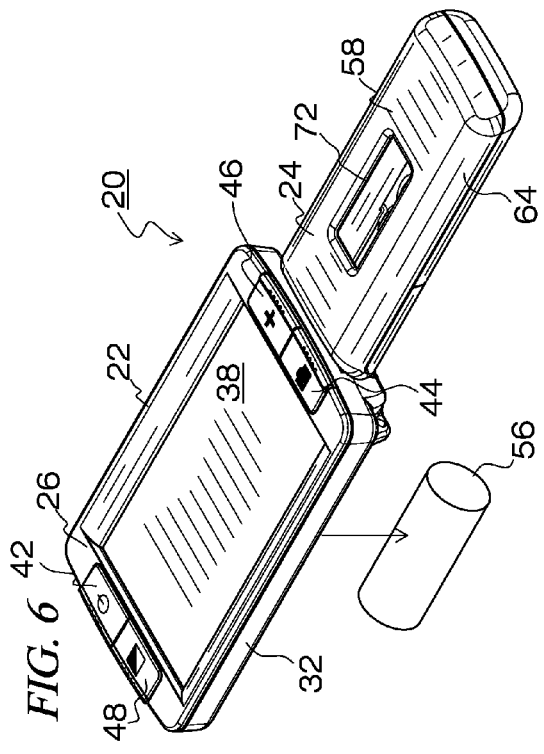

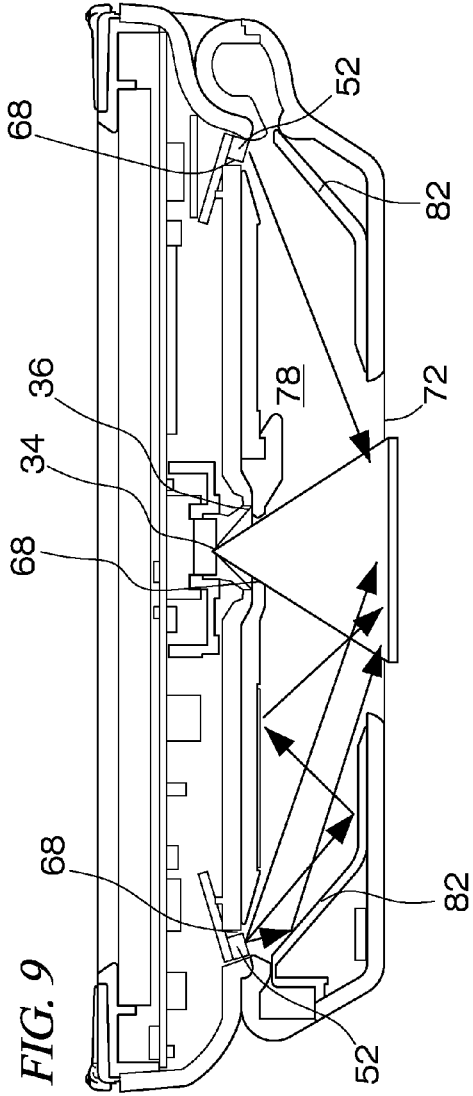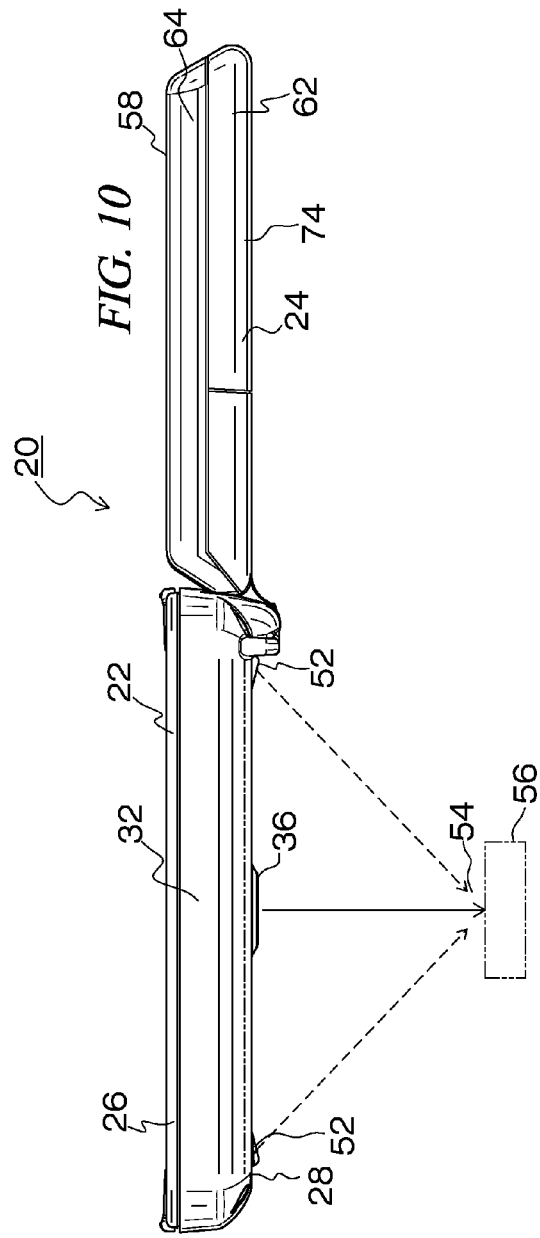

MULTIPOSITION HANDHELD ELECTRONIC MAGNIFIER

RELATED APPLICATION DATA

This is a continuation of application Ser. No. 13/584,204, filed Aug. 13, 2012, and entitled "Multiposition Handheld Electronic Magnifier," which is a continuation of application Ser. No. 12/478,993, filed Jun. 5, 2009, and entitled "Multiposition Handheld Electronic Magnifier," now U.S. Pat. No. 8,264,598, issued Sep. 11, 2012, which is a continuation-in-part of application Ser. No. 12/235,182 filed on Sep. 22, 2008, and entitled "Portable Multi Position Magnifier Camera," now U.S. Pat. No. 8,259,222, issued Sep. 4, 2012, which itself claims priority to provisional application Ser. No. 61/085,966, filed on Aug. 4, 2008, and entitled "Portable Multi Position Magnifier Camera." The contents of all these applications are fully incorporated herein by reference.

BACKGROUND OF THE INVENTION

1. Field of the Invention

This invention relates to a magnification device for individuals with low vision. More particularly, the present invention relates to a handheld magnification device that has a variety of discrete configurations.

2. Description of the Background Art

The use of electronic magnifiers for low vision users is known in the art. To date, however, these magnifiers have been heavy, bulky, and cumbersome to use. Additionally, many of these magnifiers have only one mode of operation, a mode that requires the user to hold the device at a fixed distance above the object being viewed. Prior art magnifiers also suffer from lack portability, which is problematic for users who may need assistance viewing objects when they are away from a traditional magnifier.

What is needed, then, is a magnifier with multiple configurations and modes of operation, whereby a user can use the magnifier by either holding the device relative to the object or by placing the device upon the object itself. There is an additional need for a magnifier that allows users to interact with the object while it is being magnified. There is also a need in the art for a magnifier that is handheld and easily transportable.

The portable multi position magnifier camera of the present invention is directed at fulfilling these needs.

SUMMARY OF THE INVENTION

It is therefore one of the objectives of this invention to allow a user to configure a magnifier camera into one of a variety of viewing modes so as to optimize the viewing of different sized objects at differing distances.

It is another objective of this invention to provide a magnifier camera that can either be held in front of an object to be viewed or positioned upon the object to be viewed.

It is yet another objective of this invention to provide a magnifier camera that has is hand-held, compact, and readily transportable.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is front plan view of the magnifier of the present invention.

FIG. 2 is a back plan view of the magnifier of the present invention.

FIG. 5 is a side view illustrating the various orientations of the magnifying apparatus.

FIG. 6 is a view of the magnifying apparatus in its first orientation.

FIG. 7 is a view of the magnifying apparatus in its third orientation.

FIG. 8 is a view of the magnifying apparatus in its second orientation.

FIG. 9 is a cross sectional view showing the internal light chamber of the handle.

FIG. 10 is a side view of the magnifier illustrating the light being directed to a focal point beneath the housing.

Similar reference characters refer to similar parts throughout the several views of the drawings.

PARTS LIST

Figure 3:
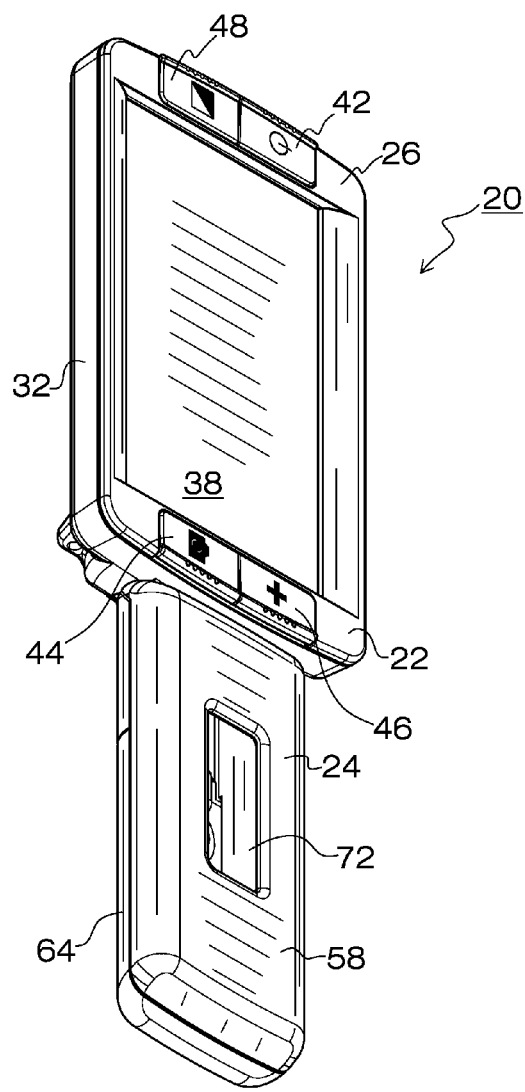
FIG. 3 is a perspective view of the front of the magnifying apparatus.

20 Magnifier Device
22 Housing
24 Handle
26 Front Face (Housing)
28 Back Face (Housing)
32 Peripheral Edge (Housing)
34 Sensor
36 Aperture (Housing)
38 Screen
42 Power Button
44 Camera Button
46 Zoom Button
48 Mode Control Button
52 LEDs
54 Focal Point
56 Object Being Viewed
58 Front Face (Handle)
62 Back Face (Handle)
64 Peripheral Edge (Handle)
66 Aperture (Handle)
68 Light Guides (Handle)
72 Opening (Handle)
74 Battery Door
76 Batteries
78 Light Chamber
82 Angled Surfaces (Chamber)
84 Battery Compartments

DETAILED DESCRIPTION OF THE PREFERRED EMBODIMENT

The present invention relates to a magnifier device for use by blind or low vision users. The magnifier includes a camera that can display enlarged images of target objects for viewing by the user. The magnifier device further includes a handle that is pivotally interconnected to a housing to thereby allow the device to be configured in a number of different configurations. The various features of the present invention, and the manner in which they interrelate, will be described in greater detail hereinafter.

With reference to FIGS. 1-4, the housing 22 and interconnected handle 24 of the magnifier 20 are illustrated. These components are preferably formed from an impact resistant plastic, such as an acrylonitrile butadiene styrene (ABS) plastic, or an equivalent thereof. Handle 24 and housing 22 are engaged with one another about an axis to thereby permit rotation of handle 24. As noted more fully hereinafter, magnifier 20 takes on various configurations based upon the angle of handle 24.

Housing 22 is defined by front and back faces (26 and 28, respectively) and an associated peripheral edge 32. With reference to FIG. 2, the camera for use with the magnifier is depicted. In the preferred embodiment, camera is a 3 megapixel CMOS sensor 34. Such sensors are commercially available and those of ordinary skill in the art will appreciate suitable equivalents thereto. With continuing reference to FIG. 2, it is seen that the sensor 34 includes an aperture that is aligned with an aperture 36 on the back face 28 of housing 22. The output from sensor 34 is supplied to a field programmable gate array (FPGA) and an image buffer. Additionally, images captured by sensor 34 can be stored in non-volatile memory to be recalled later by the user. The images can be processed by the imaging method described in commonly owned and co-pending application entitled "System and Method for Imaging Objects" (app. No. 61/099,185) filed on Sep. 22, 2008. The contents of this co-pending application are fully incorporated herein.

Stored images, or images currently viewed with sensor 34, can be displayed on screen 38. In the depicted embodiment, an LCD screen 38 is employed. Screen 38 is ideally recessed within front face 26 of housing 22. As such, a peripheral edge 32 is inwardly beveled. The LCD screen 38 is a full color video graphics array (VGA) display. Low-voltage differential signaling (LVDS) can be used to interconnect the LCD screen 38 to the FPGA and/or image buffer as noted above. This arrangement ensures a purely digital output on LCD screen 38 and also permits magnifier 20 to be used with an external monitor (not shown). Thus, by way of the LCD screen 38, objects within range of sensor 34 can be selectively displayed and digitally enlarged for the blind or low-vision user.

With reference to FIG. 1, the magnifier controls are illustrated. Controls are included for: power 42, camera/sensor 44, zoom 46, and mode 48. Power button 42 is used to turn the device 20 on and off. Camera button 44 is used to activate sensor 34 and also to take "snap shots" of the object being viewed. Depressing the control the first time activates sensor 34 such that the images within range are displayed on LCD screen 38. Depressing the control again captures the images and stores it in memory for later viewing. Zoom button 46 is used to change the magnification employed by sensor 34. For instance, by cycling zoom button 46, the user can select a suitable magnification level. In the preferred embodiment, magnification between 5× to 15× are possible. Finally, mode control 48 can be used to change the color combinations displayed upon screen 38. For instance, the screen can display objects in various color combinations, such as blue/green, red/yellow, or black/white. These color combinations can be cycled through until the user finds the mode effective output.

Light sources are also mounted to back face 28 of housing 22. In the preferred embodiment, these light sources are light emitting diodes (LEDs) 52. Other light sources, however, such as cold cathode fluorescent lamps (CCFLs) can alternatively be used. With particular reference to FIGS. 9 and 10, it can be seen that LEDS 52 are preferably mounted at an angle relative to the plane of housing 22. The depicted angle is approximately 45°. The back face 28 is raised about the LEDs 52 to thereby shield the LEDs 52 from damage. As illustrated, LEDs 52 are angled such that the emitted light emitting converges on a focal point 54. Preferably, focal point 54 is located at or near the object being viewed 56. LEDs 52 can be selectively illuminated depending upon ambient lighting conditions.

Figure 11:
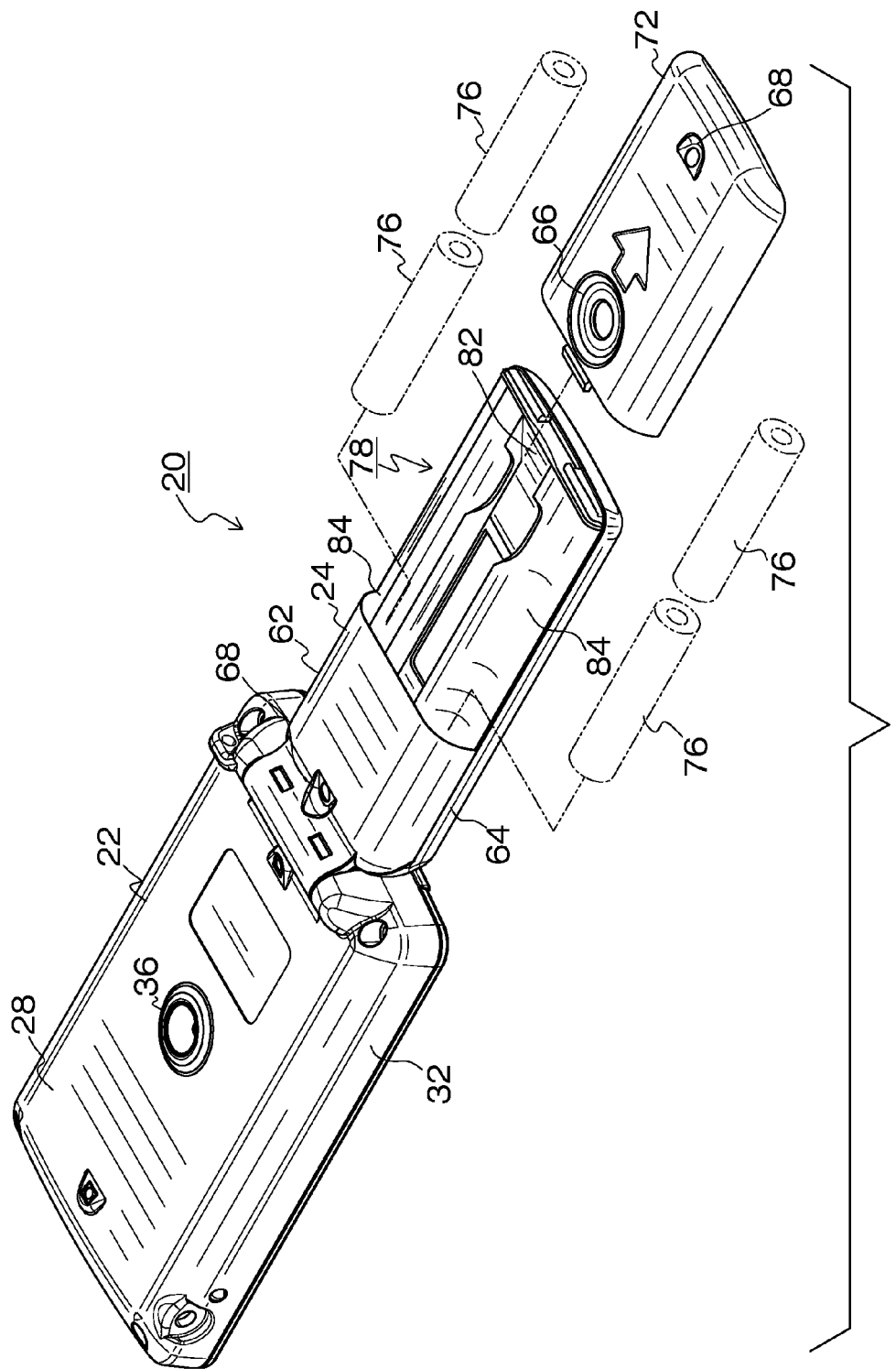
FIG. 11 is a perspective and partially exploded view of the magnifier camera with the battery cover removed.

With reference again to FIGS. 1-4, handle 24 of the device 20 is described. Handle 24 is defined by a front face 58, a back face 62, and a peripheral edge 64 therebetween. An aperture 66 and a pair of light guides 68 are formed within back face 62. Additionally, an opening 72 formed is within front face 58 and is positioned such that it is in alignment with aperture 66. As noted in FIG. 11, handle 24 further includes a battery door 74. The edges of battery door 74 are designed to slide into corresponding grooves within the peripheral edges 64 of handle 24. Door 74 serves to enclose batteries 76 that are positioned within handle 24 and which power device 20. In the depicted embodiment, four "AA" batteries 76 are used.

Figure 4:
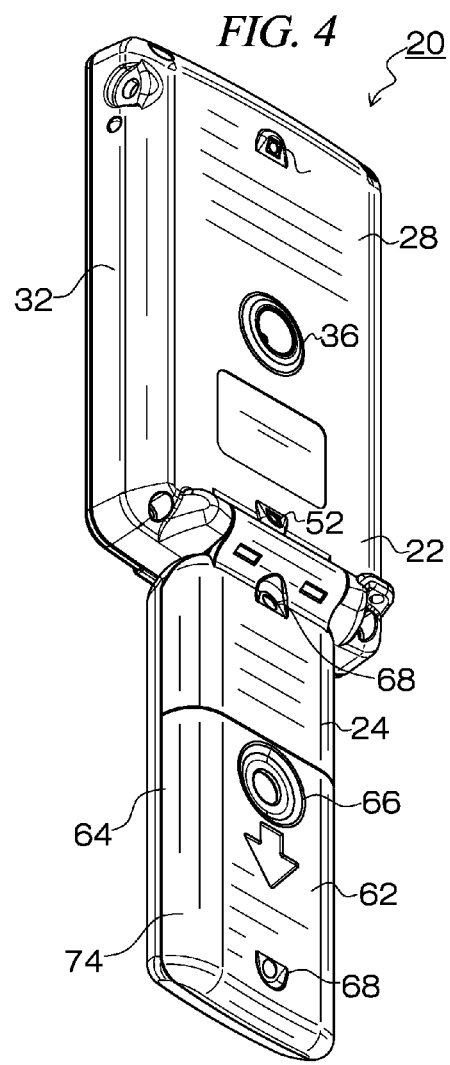
FIG. 4 is a perspective view of the back of the magnifying apparatus.

Handle 24 also includes an internal light chamber 78. Chamber 78 is most easily seen in the cross sectional view of FIG. 9. As described more fully hereinafter, light chamber 78 directs light from LEDs 52 to the object being viewed 56. One suitable light chamber is described in commonly owned U.S. Pat. No. 7,172,304 to Rodriguez et. al., the contents of which are fully incorporated herein. Whatever type of light chamber is utilized, it should include angled surfaces that are lightly colored to promote maximum light reflection and diffusion. In the preferred embodiment, light chamber 78 is white and includes angled surfaces 82 that are positioned immediately below light guides 68. With continuing reference to FIG. 4, it is seen that battery compartments 84 are positioned on either side of light chamber 78.

By pivoting handle 24 with respect to housing 22, magnifier 20 can be brought into a number of different orientations. The user can select the desired orientation for optimal viewing. The various magnifier orientations are described below in connection with FIGS. 5-8.

First Orientation

The first orientation of the magnifier 20 is depicted in FIG. 1. This orientation is defined by housing 22 and handle 24 being in alignment with one another. Namely, the angle between housing 22 and handle 24 is 180°, or approximately 180°. This orientation is preferred when magnifier 20 is used to view objects 56 at a distance or when the user otherwise does not need both hands free. In the orientation, the user holds magnifier 20 by grasping handle 24 and pointing sensor 34 at an object 56. The user's free hand can then be used to operate the controls to, for example, zoom in on the object (button 46), or take a snap shot (button 44). In this orientation, objects are viewed through the bottom of housing 22, while handle 24 is used to grasp the device 20.

Second Orientation

The second orientation of the magnifier 20 is depicted in FIG. 8. Here, handle 24 and housing 22 are positioned at an angle of less than 180°. In the depicted embodiment, housing 22 is positioned at a 90° angle relative to handle 24. When so configured, handle 24 can be positioned upon a surface, such as a table, and objects 56 can be placed in front of camera 34. Magnifier 24 can maintain this position because handle 24 is substantially heavier than housing 22 insomuch as handle 24 houses batteries. By positioning the device 20 on a table, the user is free to use both hands, as may be preferred if the object 56 needs to be manipulated in front of camera sensor 34. Thereafter, the user can utilize the controls to zoom in (button 46) and capture desired images (camera button 44).

Third Orientation

FIG. 7 illustrates the third orientation. Here, the back faces (28, 62) of the housing and handle (22, 24) are brought together, such that they are in facing relation to one another. In other words, the angle between housing 22 and handle 24 is 0°, or approximately 0°. This orientation is preferred when magnifier 20 is to be positioned directly over an object 56. This includes resting magnifier 20 directly upon a flat object 56 such as a document. In this configuration, sensor 34 is viewing the object through the aperture 36 in housing 22, as well as aperture and opening (66, 72) in handle 24. Furthermore, in the third orientation, the LEDs 52 are brought into registry with light guides 68 in handle 24. Thus, LEDs 52 direct light through light guides 68, into light chamber 78, and out through opening 72. In this manner, LEDs 52 can effectively illuminate the object being viewed 56.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A magnification device for use by blind or low vision users, the device comprising:
    a housing having a rear face with a camera and a front face with a screen adapted to display images taken by the camera, the housing storing an image processor and an image memory, the image processor being used to selectively enlarge the displayed images and change the color combinations associated with the displayed image, the displayed images being selectively stored within the image memory for later retrieval;
    a handle pivotally connected to the housing, an opening formed within the handle whereby the camera can view images through the handle;
    a battery positioned within the handle;
    the handle having at least three discrete orientations relative to the camera, in the first orientation, the handle is positioned to be grasped by the user and the camera is positioned to view distant objects, in the second orientation, the handle is positioned as a stand for the housing and the object to be viewed is positioned in front of the camera, with the battery within the handle functioning as a counterweight, in the third orientation the housing and handle are brought into facing relation, the handle is positioned on top of the object being viewed and the object is displayed on the screen.

2. A magnification device for use by blind or low vision users, the device comprising:
    a housing having a rear face with a camera and a front face with a screen adapted to display images taken by the camera, the housing storing a camera and an image processor, the image processor being used to selectively enlarge the displayed images;
    a handle pivotally connected to the housing, an opening formed within the handle whereby the camera can view images through the handle;
    a battery positioned within the handle;
    the handle having at least two discrete orientations relative to the camera, in one orientation, the handle and battery together function as a stand for the housing and the object to be viewed is positioned in front of the camera, in another orientation the housing and handle are brought into facing relation, with the object being viewed displayed on the screen.

3. The magnification device as described in claim 2 wherein the handle has three different orientations, in the first orientation, the handle is positioned to be grasped by the user and the camera is positioned to view distant objects, in the second orientation, the handle is positioned as a stand for the housing and the object to be viewed is positioned in front of the camera, in the third orientation the handle is positioned on top of the object being viewed.

4. The magnification device as described in claim 2 wherein the image processor can selectively change the color combinations associated with the displayed image.

5. The magnification device as described in claim 2 wherein the housing further includes an image memory for selectively storing images for later retrieval.

6. The magnification device as described in claim 2 wherein the images are displayed on an external monitor.

* * * * *